United States Patent Office 3,538,736
Patented Nov. 10, 1970

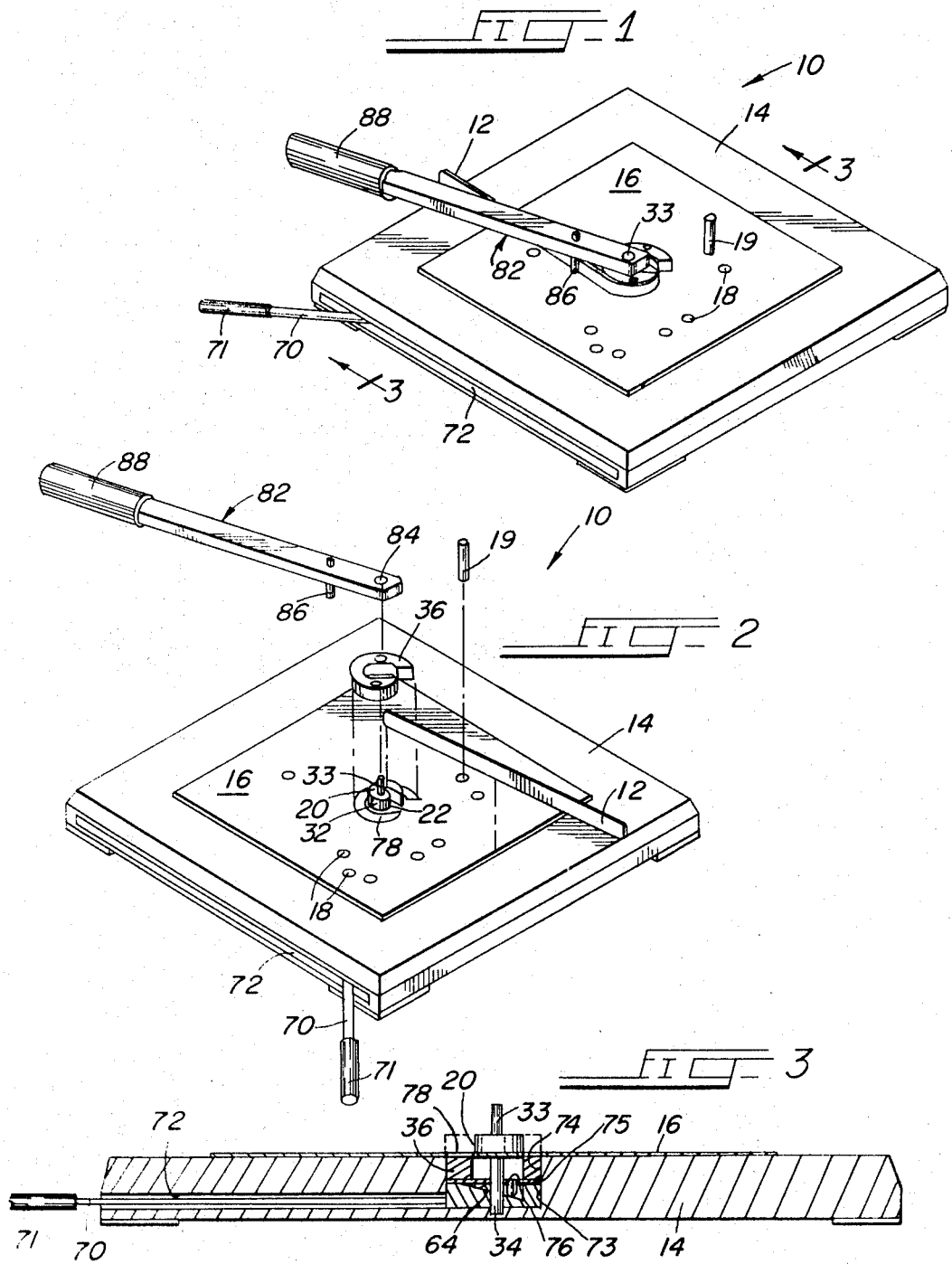

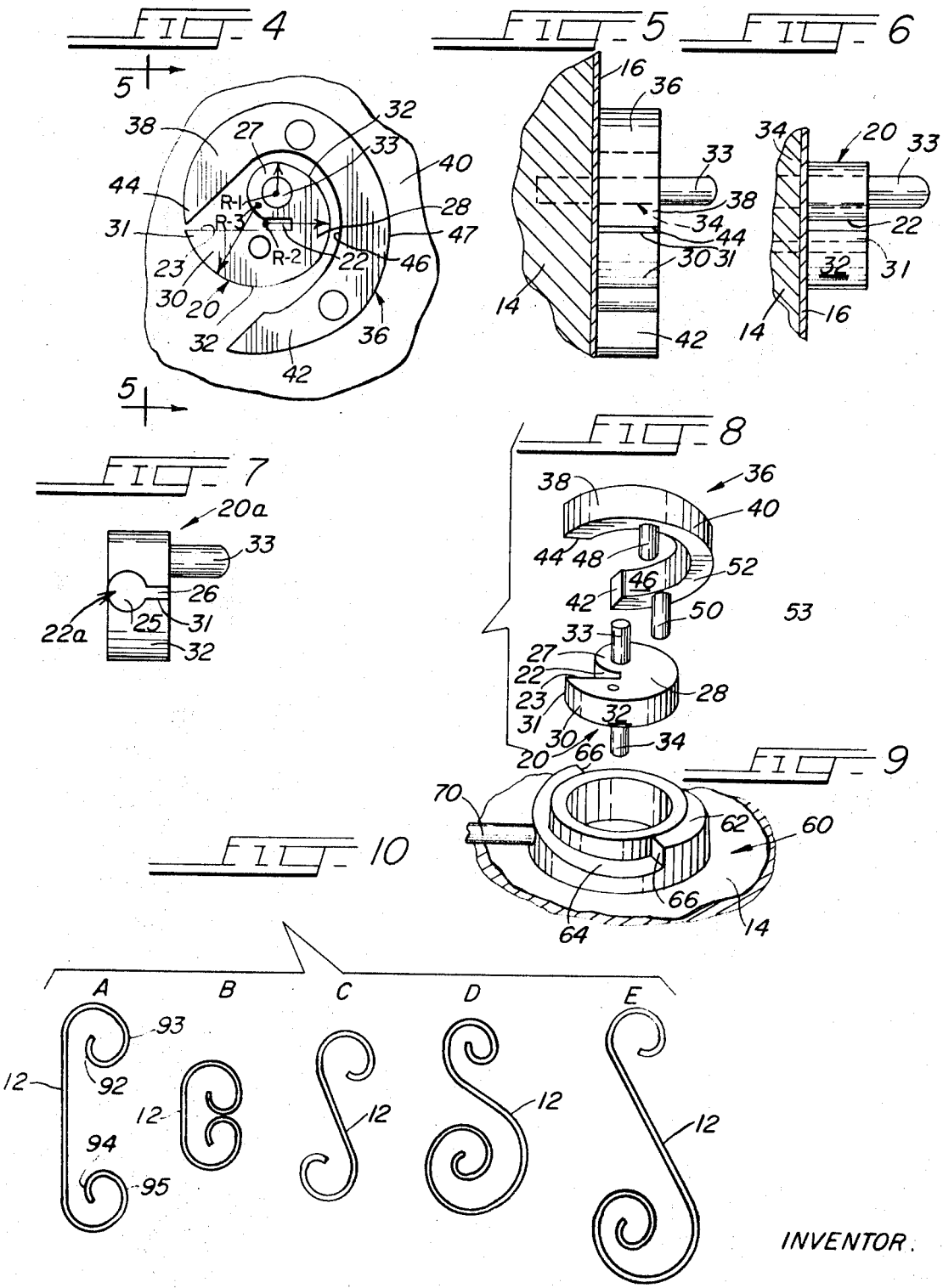

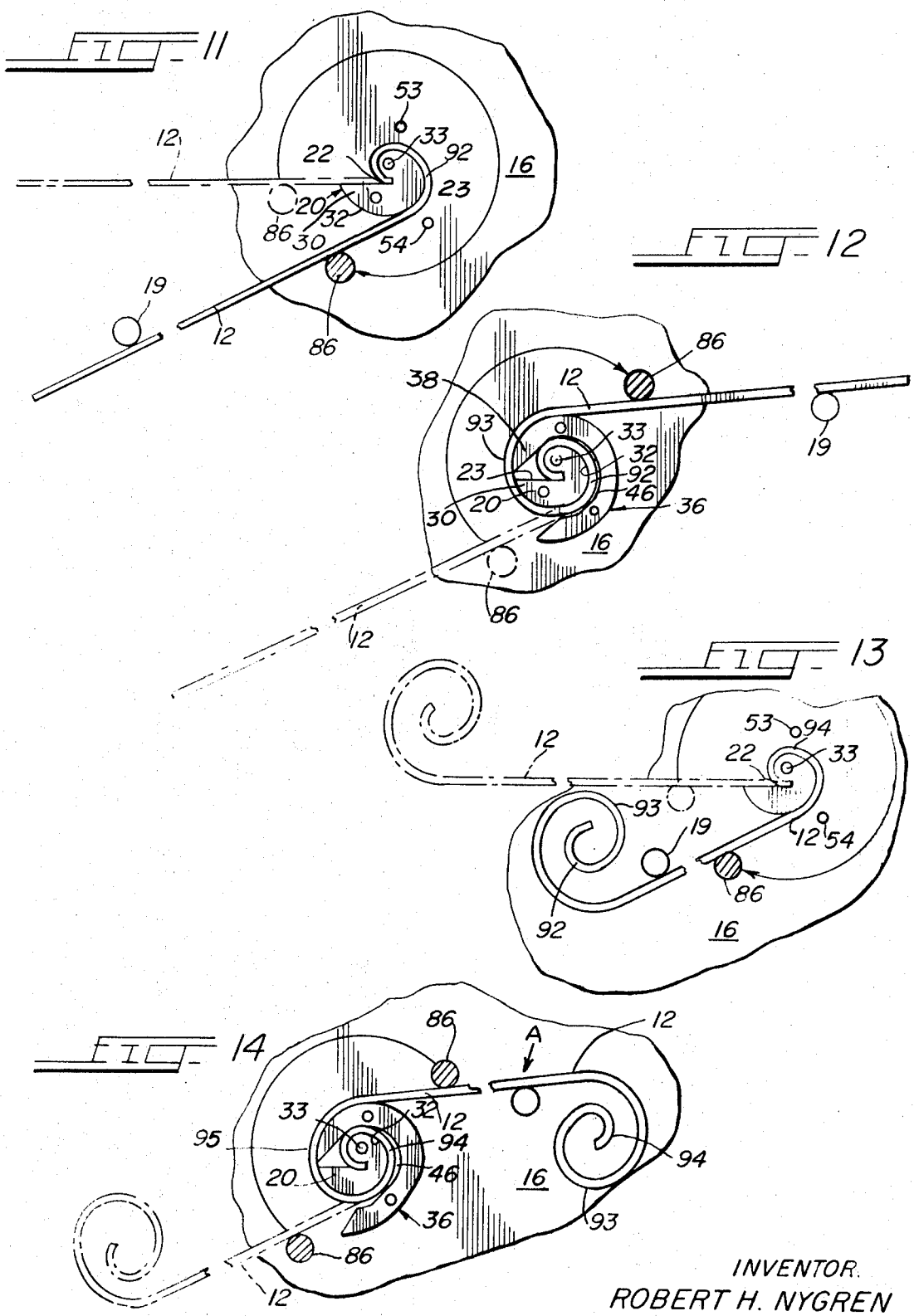

3,538,736
HAND SHAPER TOOL FOR FORMING
ELONGATED STRIPS
Robert H. Nygren, 2310 W. Arthur,
Chicago, Ill. 60645
Filed Aug. 25, 1967, Ser. No. 663,364
Int. Cl. B21d 7/02
U.S. Cl. 72—388   6 Claims

ABSTRACT OF THE DISCLOSURE

A shaper tool comprising an inner shaper member and an outer shaper member having curved surfaces for forming elongated strips of material into various shapes and configurations. Means are provided to predetermine the length of said surfaces used in the forming of the strips.

BACKGROUND OF THE INVENTION

The invention relates generally to a hand tool for forming strips of material and more particularly relates to a single hand shaper tool for forming elongated strips of material into a plurality of esthetically attractive designs.

The prior hand tools for forming strips of material into designs and shapes were generally only capable of providing a single shape or curvature. Thus, if it was desired to form a strip of material into more than one shape, it was required to use a different shaper tool for each selected shape. Moreover, since these hand tools were not designed to precisely cooperate with each other, the formed shapes did not have the appearance of a continuous and uninterrupted contour. This appreciably reduced its attractiveness.

Another problem with the prior hand shaper tools was the difficulty to accurately control the contours of the formed strips. Thus, heretofore it was virtually impossible by means of a hand tool to provide identical designs. This problem was substantially greater if more than a single variation was desired in the curvature of a strip.

SUMMARY OF THE INVENTION

The hand shaper tool of this invention includes means to provide more than one shape in a single strip of material. Said means enables a plurality of different designs to be formed in strips of material with the same tool.

The hand shaper tool of this invention comprises an inner shaper member and an outer shaper member to provide curved surfaces for forming elongated strips into various preselected designs. The shaper tool includes means enabling the designs to be accurately reproduced.

Furthermore, the inner and outer shaper members cooperate with each other to afford curved configurations having a continuous and uninterrupted appearance; thereby providing an attractive and eye pleasing design.

Bending means are provided to concentrate bending force adjacent the area where the elongated strip is being formed and thereby assure a positive bend for each shape or contour in the strip.

Control means are provided to accurately control the dimension of each variation in the contour of the formed strip.

It is therefore a primary object of this invention to provide a hand shaper tool for forming strips of material into various designs.

Another object is to provide a hand tool for accurately and precisely forming elongated strips into predetermined designs.

Another object is to accurately control the dimensions of the various shapes formed from each strip.

Another object is to provide a hand shaper tool to afford the amateur the capability of forming elongated strips having the appearance that it was formed by a skilled craftsman.

Another object is to provide simplified means for shaping elongated strips into attractive designs which may be connected together to form ornamental shelf brackets, wall sconces, candelabras, etc.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings;

FIG. 1 is a perspective view of the hand shaper tool for forming elongated strips of material embodying the principle of the invention;

FIG. 2 is an exploded perspective view of the tool shown in FIG. 1;

FIG. 3 is a cross-sectional view, taken on the plane of the line 3—3 in FIG. 1, viewed in the direction indicated, and illustrating the elements for controlling the position of the second shaper member;

FIG. 4 is an enlarged top plan view of the inner shaper member and the outer shaper member;

FIG. 5 is a side view, taken on the plane of the line 5—5 in FIG. 4, viewed in the direction indicated, and showing the inner shaper member and the outer shaper member;

FIG. 6 is a view similar to FIG. 5 but with the outer shaper member removed;

FIG. 7 is a view similar to FIG. 6 showing an alternate shape for the mouth of the inner shaper member;

FIG. 8 is an enlarged perspective view of the outer shaper member spaced above the inner shaper member;

FIG. 9 shows a cam means for controlling the position of the outer shaper member;

FIG. 10 illustrates five designs which may be formed from an elongated strip with the hand shaper tool of FIG. 1; and FIGS. 11, 12, 13, and 14 show the steps for forming the "A" design illustrated in FIG. 10;

FIG. 11 shows the first bend of the elongated strip and illustrates the start of the bend in phantom;

FIG. 12 shows the second bend of the strip in FIG. 11 and illustrates the start of the bend in phantom;

FIG. 13 shows the first bend in the opposite end of the strip of FIG. 12 and illustrates the start of the bend in phantom; and FIG. 14 illustrates the final bend for the strip of FIG. 13 which completes the forming of piece "A" and illustrates the start position for the final bend in phantom.

DESCRIPTION OF THE PREFERRED EMBODIMENT

Referring now particularly to FIGS. 1 and 2 of the drawings the reference numeral 10 indicates generally a hand shaper tool for forming elongated strips 12 of material into various shapes and configurations. FIG. 10 illustrates for example, five designs designated by the reference letters A, B, C, D, and E, which may be formed from the strips 12 by the use of the shaper tool 10. The various designs shaped by the tool 10 may be attached together by welding, an epoxy cement or any other suitable means to form wall sconces, shelf brackets, candelabras, etc.

The hand shaper tool 10 comprises a base board 14 (FIGS. 1, 2, and 3) on which a base plate 16 is mounted. The base plate 16 is formed with a plurality of apertures 18 positioned at predetermined locations on the base plate 16. A post 19 is removably positioned in a predetermined aperture 18. The position for the post corresponds to an end point for a specific bend formed in the strip 12, as will be fully described later in the specification.

An inner shaper member 20 (FIGS. 2, 4, 11 to 14) is rigidly mounted at a center point on the base plate 16. The inner shaper member 20 includes a mouth 22 to receive one end of the strip 12. A substantially flat wall 23 (FIG. 4) defines part of the mouth 22 and extends outward therefrom. The flat wall 23 provides a supporting or bracing surface for the strip 12 when one of it's ends is inserted into the mouth 22.

The mouth 22 may define a rectangular groove (see FIGS. 4, 6 and 8). Alternatively, the mouth may be circularly shaped to accommodate circular cross-sectional stock. FIG. 7 illustrates an inner shaper member indicated generally by the reference designation 20a having a mouth referred to generally by the designation 22a. The mouth 22a comprises a circular portion 25 and a rectangular portion 26. The circular portion 25 receives rods having a circular cross-sectional area. The rectangular portion 26 cooperates with the circular portion to receive rods having a rectangular cross-sectional area.

The inner shaper 20 includes a first arcuate portion 27, a second arcuate portion 28 and a third arcuate portion 30 (FIGS. 4 and 8). Turning specifically to FIG. 4, it will be seen that the radius for the arcs forming the arcuate portions 27, 28, and 30 progressively increases around the inner shaper member 20. The radius R1 for the first portion 26 is the smallest and the radius R3 for the arcuate portion 30 is larger than R2 or R1. Therefore, the sharpest or most pronounced bend is adjacent the first arcuate portion 27 (see FIGS. 11 to 14).

The outermost end 31 (see FIGS. 4, 5, and 8) of the third arcuate portion 30 is the farthest outward extending point of the inner shaper member 20 from the mouth 22. The strip 12 may be bent around the outer side surface 32 of the inner shaper member 20 from the mouth to the outer end 31.

A stub 33 extends upward from the inner shaper member 20. Preferably, the stub 33 is secured to the shaper member 20 at or adjacent the first arcuate portion 27. The stub 33 may be the outer end of a fastening peg 34 (FIGS. 3, 5, and 6) which secures the inner shaper member 20 to the base board 14.

An outer shaper member 36 is movably associated with the base plate 16 (FIGS. 2, 4, 8, 12 and 14). The outer shaper member 36 essentially comprises three arcuate segments; a front arcuate segment 38, an intermediate arcuate segment 40 and a rear segment 42. The front end 44 of the front arcuate segment 38 lies adjacent the outermost end 31 of the third portion 30 of the inner shaper member 20 when the outer shaper member 36 is operatively in position, as shown in FIGS. 4, 5, 12 and 14. The radius of curvature R3 (FIG. 4) of the third arcuate portion 30 of the inner shaper member is the same as the front arcuate segment 38 of the outer shaper member to insure a smooth transition of the formed strip 12 from the inner shaper member to the outer shaper member (see FIGS. 12 and 14).

As shown specifically in FIGS. 12 and 14, the inner surface 46 of the outer shaper member is spaced from the outer surface 32 of the second arcuate portion of the inner shaper member, a sufficient distance to accommodate the formed portion of the strip therebetween.

A pair of spaced prongs 48, 50 extend outward from the lower surface 52 of the outer shaper member 36 (see FIG. 8). The prongs 48, 50 may press fit into a pair of apertures 53, 54 formed in the base plate 16 (see FIGS. 11 and 13). If the prongs are associated to the base plate by press fitting into the apertures 53, 54, the outer shaper member 36 must be completely lifted away from the base plate when the inner shaper member 20 is being used to form the first bend in the strip 12.

Alternatively, the prongs of the outer shaper member 36 may be mechanically moved into position shown in FIG. 1 by a cam means indicated by the reference 60 (see FIGS. 3 and 9). The cam means 60 comprises a first sliding surface 62 and a second sliding surface 64. Each sliding surface preferably extends upwardly from a lower level along a substantially spiral path. Adjacent the lower level of each sliding surface 62, 64 is a stop 66 which is a vertically extending wall surface.

A control arm 70 extends outward from the cam means 60 to the outside of the base board (see FIGS. 1 to 3 and 9). The outer end 71 of the control arm 70 is manipulated from the outside of the base board 14 and the control arm 70 is movable within a cavity 72 inside the base board.

The cam means 60 is positioned in a lower chamber 73 formed in the base board 14 (FIG. 3). An upper chamber 74 is separated from the lower chamber by a partition wall 75. A pair of apertures 76 is formed in the partition wall 75 to receive the prongs 48, 50 of the second shaper member 36 (only one aperture is shown in FIG. 3). The cam means 60 moves the outer shaper member 36 through a cutout 78 in the top of the base plate 16 which communicates with the upper chamber 74.

The outer shaper member 36 when controlled by the cam means 60 has an operative position above the base plate 16 and a nonoperative position inside the base board 14. When the outer shaper member 36 is in the nonoperative position, the prongs 48, 50 extend through the openings 76 in the partition wall 75 separating the lower chamber 73 from the upper chamber 74, and the extreme ends of the prongs lie at the lowermost level of the sliding surfaces 62 and 64 of the cam means 60, as shown in FIG. 3. As the control arm 70 is moved arcuately within a horizontal plane through the cavity 72, the cam means 60 is rotated and the sliding surfaces 62 and 64 lift the prongs 48 upward whereby the outer shaper member moves upward and through the cutout 78 to its operative position above the base plate 16 (see FIGS. 1 and 5). The rotation of the cam means 60 in the opposite direction causes the outer shaper member 36 to fall by gravity inside the base board 14 and back to its nonoperative position.

A driver arm 82 (FIGS. 1 and 2), is used to bend the strip around the inner shaper member 20 and the outer shaper member 36. The driver arm 82 includes a circular aperture 84 at the inner end thereof which frictionally fits on the stub 33. A finger 86 extends outward from the driver arm 82 and is positioned to provide an abutting force against the strip when the arm 82 is rotated around the stub 33 to form the strip 12 to the contours of the inner and outer shaper members 20, 36. A handle 88 is disposed at the outer end of the driver arm 82. The handle 88, as shown, extends outward from the base board.

The finger 86 is integrally formed on the arm 82 at a point substantially closer to the apertured end than to the handle 88 end. This insures a substantial concentration of force at the finger 86 to abutt against the strip 12 when force is applied to the handle 88.

Turning now to FIGS. 11 to 14, the operation of the shaper tool will be described for forming the "A" design in FIG. 10. The post 19 is inserted into a predetermined aperture. The strip 12 is inserted into the mouth 22. To insure the strip is securely in place, the strip should be flush against the wall 23. The apertured end of the driver arm 82 is positioned on the stub 33, but for convenience of illustration, the arm is not shown on the stub 33 in FIGS. 11 to 14. The finger 86 of the driver arm 82 should now be in an abutting relationship with the strip 12, as shown in phantom in FIG. 11. The arm 82 is rotated by applying force at the handle 88. The force applied at the handle is transmitted to the finger 86. In this manner, a substantial concentration of force is applied against the strip 12 to cause a positive and smooth bend. The strip 12 is formed around the inner shaper member 20 until an outer part of the strip contacts the post 19.

The outer shaper member 36 is now positioned on the plate 16, as shown in FIG. 13. This may be done by press fitting the prongs 48, 50 into the apertures 53, 54. The outer shaper member may be positioned on the plate by the alternative means as previously explained when describing the operation of the cam means 60. The post 19 is inserted in a different aperture 18 which serves as the end point for the next bend formed in the strip 12. The arm 82 is again rotated and the force applied by the finger 86 forms the strip to the outside surface 32 of the third arcuate portion 30 of the inner shaper member 20 and the outer surface 47 of the front arcuate segment 38 of the outer shaper member until the strip 12 abutts the post 19. Thus, one end of the strip 12 has been formed to the desired design.

The outer shaper member 36 is lifted away from the plate 16. The opposite end of the strip 12 is inserted in the mouth 22 as shown in phantom in FIG. 13. The post 19 is inserted into another aperture 18 to provide the end point for the first bend in said opposite end of the strip. The strip 12 is formed around the outer surface 32 of the inner shaper member 20 until contacting the post 19.

As shown in FIG. 14, the outer shaper member 36 is again positioned on the plate 16 by inserting the prongs 48, 50 into the apertures 53 and 54. The strip 12 is formed around the third portion 30 of the inner shaper member 20 and the front segment 38 of the outer shaper member 36 to complete the forming of the design "A."

In a similar manner, the B, C, D and E designs shown in FIG. 10 may be formed or a plurality of entirely different designs may be formed using the same technique outlined above for forming the "A" design. To achieve any of the multitude of designs capable of being formed by the shaper tool 10, the position of the post 19 should be predetermined so that an exact and precise bend may be formed in the strip. Therefore, in the actual use of the shaper tool 10, the apertures 18 for receiving the post 19 are numbered, so that the tool 10, may be programed to form a plurality of designs. Thus, for example, an instruction sheet for a particular design would state that the post 19 be placed in a particular aperture for the first bend in the strip around the inner shaper member 20 and placed in another particular aperture for a second bend, which may be formed around the outer shaper member 36, etc.

From the drawings and the foregoing description, it should be apparent that a novel shaper tool has been provided which accomplishes the aforestated objects in an efficient and simplified manner. The shaper tool is designed to provide a smooth continuous curved shape in the strip as the strip is formed around the inner and outer shaper members.

The radius of curvature at the back end of the inner shaper member and the front end of the outer shaper member is substantially identical to afford an uninterrupted transition as the bend of the strip is formed from the inner shaper member to the outer shaper member.

The force applied to the driver arm is transmitted to a finger disposed adjacent the area of the strip being formed. In this manner, a concentrated force is in continual abutment with the strip while the same is being formed.

The outer shaper member may be positioned on the base plate by press fitting the prongs 48, 50 into apertures or alternatively a cam means 60 may be used to lift the outer shaper member into position and to permit the outer shaper member to drop out of position.

A post is inserted into predetermined apertures to provide the end point for a particular design or shape formed in the strip. By carefully arranging and locating the apertures, the shaper tool may be programed to precisely and accurately form a plurality of attractive designs. Combinations of these designs, such as those shown in FIG. 10, may be securely assembled together into attractive wall and table decorations. The forming of the strips into designs with tool 10 may provide an enjoyable and productive hobby.

Although the preferred embodiment describes curved inner and outer shaper members, it is within the contemplation of the invention to form substantially any shape by means of the principles of this invention.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is;

1. A shaper tool for forming an elongated strip of material comprising:
   a base plate;
   an inner shaper member fixedly attached to the base plate;
   an outer shaper member removably associated with the base plate;
   bending means for forming said strip around said inner shaper member and outer shaper member;
   a plurality of apertures formed in said base plate, at least one of the apertures being spaced a predetermined distance from the inner shaper member, the remainder of said apertures being spaced predetermined distances from the outer shaper member;
   a post for removably positioning in said apertures to provide an abutment and prevent further bending of said strip, said post being positioned in said aperture to provide an end point for a predetermined bend in said strip as determined by the location of said one aperture when the strip is formed around said inner shaper member, said post being positioned in one of the remainder of said apertures to provide an end point for another predetermined bend as determined by the location of said last mentioned one aperture when the strip is formed around the outer shaper member.

2. A shaper tool for forming an elongated strip of material comprising:
   a base plate;
   an inner shaper member associated with the base plate, said inner shaper member comprising a front end portion, a back end portion and an intermediate portion therebetween, the outer surface of said front, back, and intermediate portions around which said strip is bent comprising an arc formed respectively from a first, second and third radius, said first, second and third radius being respectively of increasing magnitude;

an outer shaper member removably associated with the base plate;

bending means for forming said strip around said shaper members;

a plurality of apertures formed in said base plate, said apertures being spaced predetermined distances from the shaper members; and a post for removably positioning in any one of said apertures to provide an abutment and prevent further bending of said strip, said post being positioned in any one of said apertures to provide an end point for a predetermined bend in said strip as determined by the location of said aperture.

3. A shaper tool for forming elongated strips of material comprising:

a base plate;

an inner shaper member associated with the base plate;

an outer shaper member; and a cam means having at least one upward extending sursurface associated with said outer shaper member, said outer shaper member being movable within a substantially vertical plane, the upper end of said surface supporting said outer shaper member in an operative position above said base plate and the lower end of said surface permitting the outer shaper member to drop below said base plate into a nonoperative position.

4. The shaper tool of claim 3, wherein:

said cam means comprises a first upward extending surface and a second upward extending surface, each of said surfaces having an upper end and a lower end;

said outer shaper member comprises a first prong and a second prong extending downward therefrom, said first prong being supported by said first surface and said second prong being supported by said second surface; and a handle means is secured to the cam means and extending laterally outward therefrom, said cam means being rotatable within a fixed arc upon application of an external force to the handle means, the upper ends of said surfaces supporting the outer shaper in said operative position when the cam means is at one end of said arc and the lower ends of said surfaces supporting the cam means in the nonoperative position when the cam means is at the other end of said arc.

5. A shaper tool for forming elongated strips of material comprising:

a base plate;

an inner shaper member associated with the base plate;

an outer shaper member;

securing means for associating said outer shaper member with the base plate;

bending means for forming said strips around said inner shaper member and said outer shaper member; and a mouth formed in said inner shaper member to receive one end of the strip, said mouth comprising a circular portion and a rectangular portion, said circular portion accommodating strips having circular cross-sectional areas and said rectangular portion cooperating with the circular portion as accommodate strips having rectangular cross-sectional areas.

6. The shaper tool of claim 3 further comprises:

a base board on which said base plate is mounted;

said outer shaper member comprises at least one prong extending outward therefrom;

a partition wall separating a lower chamber from an upper chamber inside said base board, said cam means positioned in the lower chamber and the outer shaper member being movable within the upper chamber, said partition wall having an opening formed therein to receive said prong, the extreme end of said prong contacting said surface;

a cutout formed in said base plate communicating with the upper chamber to permit the outer shaper member to pass in and out of the chamber, said outer shaper member extending through said cutout and above said base plate when in an operative position for shaping said strip of material, said outer shaper member being within said upper chamber and below said base plate when in a nonoperative position.

References Cited

UNITED STATES PATENTS

| | | | |
|---|---|---|---|
| 805,231 | 11/1905 | Pembroke | 72—147 |
| 975,787 | 11/1910 | Palmenberg | 72—388 |
| 1,174,143 | 3/1916 | Heinen | 72—388 |
| 1,425,261 | 8/1922 | Kardong | 72—388 |
| 2,649,887 | 8/1953 | Lehman | 72—147 |
| 3,332,267 | 7/1967 | Allison | 72—147 |

CHARLES W. LANHAM, Primary Examiner

G. P. CROSBY, Assistant Examiner

U.S. Cl. X.R.

72—457